(12) United States Patent
Todd

(10) Patent No.: US 6,437,693 B1
(45) Date of Patent: Aug. 20, 2002

(54) FSK RECEIVER

(75) Inventor: Robert Edmund Todd, Blyth (GB)

(73) Assignee: Cedardell Limited, Newcastle-Upon-Tyne (GB)

( * ) Notice: Subject to any disclaimer, the term of this patent is extended or adjusted under 35 U.S.C. 154(b) by 0 days.

(21) Appl. No.: 09/125,670

(22) PCT Filed: Feb. 20, 1997

(86) PCT No.: PCT/GB97/00479

§ 371 (c)(1),
(2), (4) Date: Dec. 8, 1998

(87) PCT Pub. No.: WO97/31466

PCT Pub. Date: Aug. 28, 1997

(30) Foreign Application Priority Data

Feb. 21, 1996 (GB) .............................. 9603609

(51) Int. Cl.⁷ ................................................. G08B 1/08
(52) U.S. Cl. ...................................... 340/541; 340/539
(58) Field of Search ................................ 340/541, 539, 340/534; 708/300; 455/142; 341/110, 112; 329/302, 303, 301, 300; 375/272, 324, 334

(56) References Cited

U.S. PATENT DOCUMENTS

| 4,893,316 | A | * | 1/1990 | Janc et al. ............... 375/44 |
| 5,345,187 | A | * | 9/1994 | McGuire ................ 329/302 |
| 5,414,736 | A | * | 5/1995 | Hasegawa et al. ........ 375/334 |
| 5,418,815 | A | * | 5/1995 | Ishikawa et al. ......... 375/216 |
| 5,446,762 | A | * | 8/1995 | Ohba et al. ............ 375/324 |

FOREIGN PATENT DOCUMENTS

| EP | 0442578 | 8/1991 |
| EP | 0527469 | 2/1993 |
| EP | 0755113 | 1/1997 |
| GB | 2290202 | 12/1995 |

* cited by examiner

Primary Examiner—Anh La
(74) Attorney, Agent, or Firm—Bliss McGlynn, P.C.

(57) ABSTRACT

A signal processing apparatus (1) comprises an analogue RF receiver (2) which has a local oscillator (7). The analogue receiver (2) receives in use a first electrical signal from antenna (4) at a carrier frequency, which signal is modulated by a digitised modulating signal to provide a second electrical signal having an amplitude representing an instantaneous logic level of the digitised modulating signal. The apparatus further comprises a digital processor (13) for processing the second electrical signal and providing an output signal in response thereto. The digital processor is controlled in use by clock signals provided in response to actuation of a local oscillator of the analogue receiver.

11 Claims, 1 Drawing Sheet

FSK RECEIVER

BACKGROUND OF THE INVENTION

The present invention relates to an apparatus for processing radiated digitised radio frequency (RF) signals, and relates particularly, but not exclusively, to an apparatus for processing radiated digitised frequency modulated (FM) radio frequency signals.

Radio frequency transmission of digital signals is usually achieved by means of frequency-shift keying (FSK), in which a radio frequency (RF) carrier signal is shifted in frequency between two closely spaced frequencies, respectively above and below the carrier frequency, representing the 1's and 0's of digital serial bits transmitted. A received FSK signal is detected by processing the carrier signal by means of an analog receiver having a local oscillator to produce a signal at an intermediate frequency which is a frequency shifted version of the RF signal at the carrier frequency. The signal at the intermediate frequency is subsequently fed to a limiting amplifier and then to a detector, which provides an output signal having an amplitude representing the digital frequency modulating signal. The output from the receiver is in the form of a series of data bits, and is then processed by means of a digital circuit which either provides output analog signals representing the original analog signal of which a digital version is transmitted, or output signals to enable various functions to be carried out, such as automatic telephone dialling by security apparatus, in response to the RF signal being transmitted.

Existing apparatus for processing digitised RF signals suffers from the drawback that interference between the local oscillator of the analog receiver and a clock generator, which is needed to operate the digital processor limits the extent to which the analog receiver and digital processor can operate in proximity to each other because of problems such as noise generation and the like. In order to minimise such interference between the local oscillator and clock generator, these two components need to be shielded from each other by means of cumbersome and bulky shielding arrangements, which increase the cost of apparatus and limit the extent to which the size of the apparatus can be reduced.

In existing apparatus, each track in the circuit will to some extent carry harmonics of the processor clock frequency. Any control lines driven by the processor will also occur on a "clock edge" and therefore any action performed by the processor will generate radiated and directly injected noise.

Existing apparatus therefore has to include components for filtering out such radiated and directly injected noise and also to buffer such noise. Such components also add to the cost of the apparatus and limit the extent to which the size of the apparatus can be reduced.

Preferred embodiments of the present invention seek to overcome the above disadvantages of the prior art.

SUMMARY OF THE INVENTION

According to the present invention, there is provided an apparatus for processing radiated digitised radio frequency signals, the apparatus comprising an analog receiver having at least one local oscillator, wherein the analog receiver in use receives the first electrical signal from an antenna at a carrier frequency, is modulated by a digitised modulating signal and provides a second electrical signal having an amplitude representing an instantaneous logic level of the digitised modulating signal; and a digital processor for processing the second electrical signal and providing an output signal in response thereto, wherein the digital processor in use is controlled by clock signals provided in response to actuation of a local oscillator of the analog receiver.

By providing clock signals in response to actuation of a local oscillator of the analog receiver, the clock frequency can be arranged to be an integral fraction of the local oscillator frequency. Both the clock signals and the signals from the local oscillator may be viewed as originating from a single source as they share a common control source. This means that the noise generated by the processor is in harmony with the second local oscillator and therefore the effects of the noise generation are substantially eliminated. This provides the advantage of minimising interference between the local oscillator of the analog and the clock generator of the digital processor, which gives rise to the further advantage of improving the extent to which the analog receiver and digital processor can be located close to each other in a single device.

The output signal of the digital processor may be an analog version of the digitised modulating signal. In particular, the output signal may be an audio signal.

Alternatively, or in addition, the apparatus may be security apparatus wherein the output signal of the digital processor effects one or more tasks in response to receipt of a radiated RF signal.

The radiated radio frequency signals may be frequency modulated signals.

BRIEF DESCRIPTION OF THE DRAWINGS

A preferred embodiment of the invention will now be described, by way of example only and not in any limitative sense, with reference to the accompanying drawing, in which.

DESCRIPTION OF THE PREFERRED EMBODIMENT(S)

Figure 1:
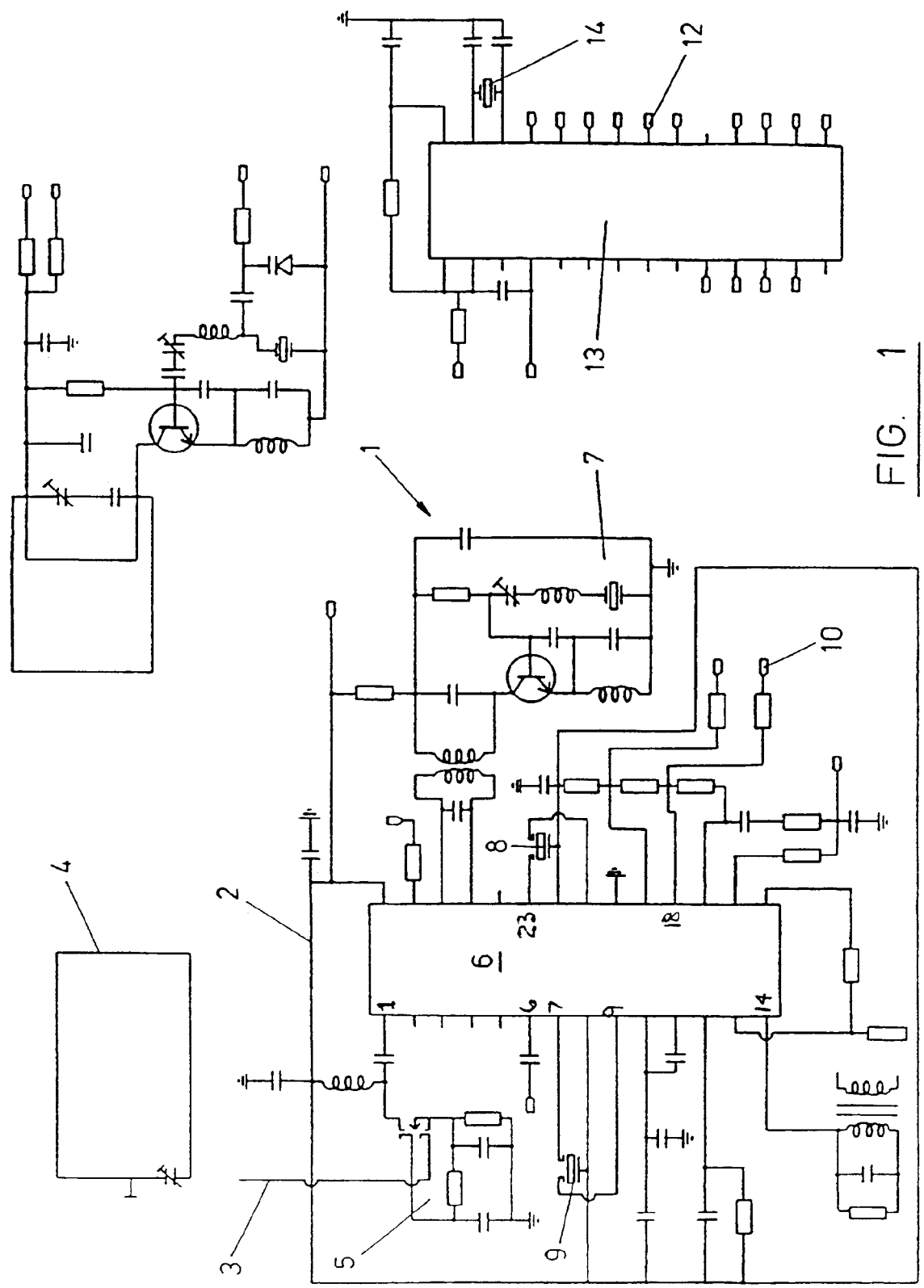
FIG. 1 shows a device for receiving digitised frequency modulated radio frequency signals embodying the present invention.

Referring to the Figures, a signal processing apparatus 1 comprises an analog RF receiver 2 which receives a digitised frequency modulated input signal at a carrier frequency along lead 3 from antenna 4. The input signal on lead 3 is amplified by input amplifier 5 and then input to pin 1 of a receiver integrated circuit 6, for example an MC 3363 integrated circuit manufactured by Motorola. The input amplifier 5 is tuned to 434 MHZ.

The integrated circuit 6 includes a first mixer in which the amplified input signal received at pin 1 is mixed with the output signal of a local oscillator 7 tuned to 423.3 MHZ to generate a signal at an intermediate frequency of 10.7 MHZ which is a frequency shifted version of the input signal received at pin 1 of the integrated circuit 6. The intermediate frequency is the difference between the frequency of the amplifier 5 and the frequency of the local oscillator 7.

The output signal of the first mixer is output from pin 23 of integrated circuit 6 and, after filtering by ceramic filter 8, is input to a second mixer through pin 21 of in the integrated circuit 6 where it is mixed with the output signal of a second local oscillator (not shown) driven by a further oscillator 14. The output of oscillator 14 is input to pin 6 of the integrated circuit 6. The second mixer outputs as a result an output signal of frequency 455 KHZ from pin 7 of integrated circuit 6. The second local oscillator is used to mix differentially down to 455 KHZ for analogue decoding. This is achieved by mixing the signal from the first mixer with that of a 10.245 MHZ crystal controlled oscillator (i.e. the oscillator 14). The processor 13 may be arranged to operate at exactly the same frequency (10.245 MHZ as the crystal controlled oscillator 14. By injecting this signal into the second local oscillator pin 6 of the ingrated circuit 6, any desired harmonic, for example, a ninth order harmonic of the incoming crystal control frequency may be selected.

If the processor 13 is arranged to operate at a harmonic of the frequency of the crystal controlled oscillator 14 then the signal may be used to drive an LC tuned circuit connected to the output of the crystal controlled oscillator 14. This output signal is then filtered by a further ceramic filter 9 and is subsequently input to a limiter amplifier connected to pin 9 of the integrated circuit 6, the output of which is then input to a detector circuit connected to pin 14 of the integrated circuit 6. The detector circuit provides an output signal having an amplitude representing the frequency shifting of the frequency modulated signal which, after passage through a frequency shift keying (FSK) comparator, provides an output signal at pin 18 of circuit 6 which represents the instantaneous logic level of the digitised frequency modulating signal received on lead 3 from antenna 4.

The signal taken from pin 18 of integrated circuit 6 is output at output terminal 10 of the receiver 2, and the signal provided at output terminal 10 is input to an input terminal 12 of a digital processor 13 such as a micro-processor. The digital processor 13 is located on the same circuit board as receiver 2 and is operated by means of a clock generator 14 which provides clock signals in response to the second oscillator 23 of the analog receiver 2. The connection between the output of second oscillator 23 and clock generator 14 is arranged such that the operating frequency of the local oscillator 7 is always a fixed multiple of the clock frequency of the clock generator 14.

The digital processor 13 receives input signal at input terminal 12 consisting of a series of digitised data bits, and processes the data to provide one or more output signals. The processor 13 includes a digital to analog converter (not shown) which outputs an analog signal representing the signal to be transmitted via antenna 4. In other words, the digital processor 13 outputs an analog audio signal, which is an analog version of the digital frequency modulating signal transmitted via antenna 4.

Alternatively, the digital processor 13 may output a digital automatic dialling signal to generate a remote alarm call in response to receipt of RF signals via antenna 4, automatically generated by security apparatus on the like.

It will be appreciated by persons skilled in the art that the above embodiment has been described by way of example only, and not in any limitative sense, and that various alterations and modifications of the invention are possible without departure from the scope of the invention as defined by the appended claims.

Although the present invention has been described with reference to radiation falling within the radio frequency band, it is to be understood that the principles can be applied to radiation in any chosen band, for example, optical or ultra violet.

What is claimed is:

1. An apparatus for processing radiated radio frequency signals, the apparatus comprising:
    (i) an analogue receiver for receiving a radio frequency signal representing a modulating signal modulated onto a carrier signal, the receiver including at least one mixer and a respective local oscillator connected to said at least one mixer, wherein said at least one mixer is adapted to receive a respective input signal and a respective reference signal from the corresponding said local oscillator and to output a frequency—shifted version of the respective said input signal, and wherein said receiver is adapted to sequentially mix said radio frequency signal by means of at least one said mixer, and a demodulator for receiving said radio frequency signal subsequently to said sequential mixing thereof, and to derive said modulating signal; and
    (ii) a processor for processing said modulating signal and including a clock generator, wherein said clock generator and said at least one mixer are operated in use by means of a common oscillator.

2. An apparatus according to claim 1, wherein the analogue receiver includes a plurality of said mixers.

3. An apparatus according to claim 2, wherein the clock generator and the local oscillator of the last mixer to which said input signal is sequentially input are operated in use by means of said common oscillator.

4. An apparatus according to claim 1, wherein the clock generator in use drives at least one said local oscillator.

5. An apparatus according to claim 1, wherein the processor is a digital processor.

6. An apparatus according to claim 1, wherein the modulating signal represents digital data transmitted by said radio frequency signal.

7. An apparatus according to claim 1, further comprising an LC tuned circuit connected to the output of said common oscillator.

8. An apparatus according to claim 1, wherein the processor is adapted to output an audio signal.

9. An apparatus according to claim 1, wherein the apparatus is a security apparatus and said processor is adapted to output a signal which effects one or more tasks in response to receipt of said radio frequency signal.

10. An apparatus according to claim 1, wherein said radio frequency signal is a frequency modulated signal.

11. An apparatus according to claim 1, wherein the common oscillator is a local oscillator of the analogue receiver.

* * * * *